(12) United States Patent
Okada et al.

(10) Patent No.: US 6,979,378 B2
(45) Date of Patent: Dec. 27, 2005

(54) TIRE FORMING SYSTEM AND TIRE FORMING METHOD

(75) Inventors: Noboru Okada, Hiratsuka (JP);
Haruhisa Hasegawa, Hiratsuka (JP);
Tatsuya Takaoka, Hiratsuka (JP);
Ichiro Takasu, Hiratsuka (JP);
Hisayoshi Fukuzawa, Hiratsuka (JP);
Susumu Imamiya, Hiratsuka (JP);
Eiichi Iida, Hiratsuka (JP); Toshihiko Take, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 772 days.

(21) Appl. No.: 09/726,548

(22) Filed: Dec. 1, 2000

(65) Prior Publication Data
US 2001/0002608 A1   Jun. 7, 2001

(30) Foreign Application Priority Data
Dec. 7, 1999   (JP) ................................ 11-348094

(51) Int. Cl.[7] ........................................... B29D 30/20
(52) U.S. Cl. .................... 156/111; 156/117; 156/130.7; 156/131; 156/133; 156/396; 156/397; 156/403; 156/406.4
(58) Field of Search ...................... 156/111, 117, 126, 156/127, 130, 130.7, 131, 133, 396, 397, 156/403, 406, 405.1, 406.4, 406.2; 211/163, 211/1.54; 221/121

(56) References Cited

U.S. PATENT DOCUMENTS

| | | | | | |
|---|---|---|---|---|---|
| 2,918,177 | A | * | 12/1959 | Nelson et al. | 211/163 |
| 3,849,231 | A | * | 11/1974 | Brey et al. | 156/403 |
| 4,314,864 | A | * | 2/1982 | Loeffler et al. | 156/111 |
| 4,351,458 | A | * | 9/1982 | Wolfe | 211/163 |
| 4,369,086 | A | * | 1/1983 | Nakahama et al. | 156/403 |
| 4,468,267 | A | * | 8/1984 | Irie | 156/133 |
| 4,553,894 | A | * | 11/1985 | Mukae et al. | 156/403 |
| 4,963,207 | A | * | 10/1990 | Laurent | 156/117 |
| 5,141,587 | A | * | 8/1992 | Sumiuchi et al. | 156/396 |
| 5,399,225 | A | * | 3/1995 | Miyamoto et al. | 156/396 |
| 5,554,242 | A | * | 9/1996 | Brown et al. | 156/111 |

FOREIGN PATENT DOCUMENTS

| | | | |
|---|---|---|---|
| EP | 624456 A1 | * | 11/1994 |
| EP | 875364 A2 | * | 11/1998 |
| EP | 958913 A1 | * | 11/1999 |
| JP | 59-93345 A | * | 5/1984 |

* cited by examiner

Primary Examiner—Geoffrey L. Knable
(74) Attorney, Agent, or Firm—Rader, Fishman & Grauer PLLC

(57) ABSTRACT

A tire forming system includes a band forming machine, a shaping forming machine, a belt/tread forming machine, means for supplying a band member and means for supplying a belt/tread member. The means for supplying the band member include an inner liner supply means, carcass supply means, band rubber parts supply means and bead supply means. The means for supplying the belt/tread member include belt supply means and tread rubber parts supply means. The means for supplying the band member and the means for supplying the belt/tread member are operative to cooperate with one another to continuously in series form a plurality of tires having different tire sizes.

4 Claims, 8 Drawing Sheets ic tires,
TIRE FORMING SYSTEM AND TIRE FORMING METHOD

BACKGROUND OF THE INVENTION

The present invention relates to a tire forming system for consistently forming a pneumatic tire from materials and a tire forming method using the system and, more detailedly, relates to a tire forming system and a tire forming method, which facilitate a stage switchover of tires different in specification and make it possible to greatly increase a production efficiency of the tire.

In the pneumatic tire, there are many sizes owing to differences in oblate ratio and tread width even if bead inner diameters are the same. Further, even if the tire sizes are the same, there is the fact that kinds of compounds and the like are finely assorted in compliance with use objects.

In case of forming such many and various pneumatic tires, setting conditions of a forming machine for the tire size can be almost automatically changed at present, but a lot of time is required in a stage switchover of members supplied to the forming machine. Therefore, hitherto it is adapted such that the members for every tire size are preliminarily prepared, these members are supplied to a forming process and collected in a lot unit for every tire size to assemble unvulcanized tires. That is, in the tire forming process, by increasing the number of tires in one lot, the stage switchover operation is reduced, so that it becomes possible to increase a productivity.

However, a vulcanizing cycle time consumed for vulcanizing one tire is about 5 to 10 times a forming cycle time consumed for forming one tire, so that a correspondence of one to one has been impossible. Therefore, even if tires of specified size are continuously formed in a lot unit, it is impossible to use metal molds for vulcanizing the tires of specified size in agreement with the forming cycle time and, as a result, the unvulcanized tires stagnate as intermediate goods in process, i.e., a lead time increases, so that the production efficiency has been reduced.

Further, in case where, like the prior art, the members for every tire size are preliminarily prepared and these members are supplied to a forming process, it is indispensable to prepare and stock many intermediate members in compliance with many and various pneumatic tires. Therefore, material expenses and management costs of the intermediate members increase, so that a production cost of the tire has been raised.

SUMMARY OF THE INVENTION

An object of the invention is to provide a tire forming system and a tire forming method, which facilitate a stage switchover of tires different in specification and make it possible to greatly increase a production efficiency of the tire.

In order to achieve the above object, the invention provides a tire forming system including a band forming machine, a shaping forming machine and a belt/tread forming machine, in each of which setting conditions of a tire size can be optionally changed, and having transport means for delivering a semi-fabricated product to each forming machine, wherein as means for supplying a band member there are provided:

(1) inner liner supply means for cutting a sheet-like inner liner material having a width, in which a splice margin is added to a band periphery length, to a length corresponding to a specification width of a formed tire, and supplying the cut inner liner to the band forming machine;

(2) carcass supply means for cutting a sheet-like carcass material having a width, in which a splice margin is added to a band periphery length, to a length corresponding to a specification width of the formed tire, and supplying the cut carcass to the band forming machine;

(3) band rubber parts supply means for injecting a rubber strip from an injection unit, winding the rubber strip around a drum of the band forming machine, and forming, on the basis of its laminated structure, a rubber parts having a profile corresponding to a specification of the formed tire; and (4) bead supply means for supplying a completed bead corresponding to a specification of the formed tire to the band forming machine through a bead setter; and as means for supplying a belt/tread member there are provided:

(5) belt supply means for cutting a strip-like belt material, in which plural cords are arranged and rubberized, to predetermined length and angle, mutually splicing edge portions of the plural cut strip pieces to form a belt for one tire, which has a length, a cord angle and a width corresponding to specifications of the formed tire, and supplying the belt to the belt/tread forming machine; and (6) tread rubber parts supply means for injecting a rubber strip from an injection unit, winding the rubber strip around a drum of the belt/tread forming machine, and forming, on the basis of its laminated structure, a rubber parts having a profile corresponding to a specification of the formed tire.

In the tire forming system in which the setting conditions of the tire size can be optionally changed in this manner, in regard to the tire having a specified band periphery length, since the supply means for all parts are constituted so as to be optionally set in compliance with the specification of the formed tire, it is possible to instantaneously perform the stage switchover so long as the tire has the same bead inner diameter, so that it is possible to continuously form the tires different in specification in one unit. Incidentally, the specification of the formed tire means tire forming conditions including a tire size, a thickness of rubber parts, a profile of tire, and the like.

And, if it becomes possible to form the tires different in specification in one unit, since it becomes null that unvulcanized tires waiting for being vulcanized in a specified metal mold are accumulated, it is possible to improve an operating efficiency of the metal mold, thereby reducing the goods in process of the unvulcanized tires. Further, in the above tire forming system, since parts preparation process is connected to each forming machine, it is possible to reduce the goods in process of intermediate members. As a result, it becomes possible to reduce costs of the goods in process, a management and auxiliary members, so that it becomes possible to greatly increase the production efficiency of the tire and, additionally, manufacture the tire stable in its quality.

In the invention, as the sheet-like inner liner and carcass materials, although one having the width in which the splice margin is added to the band periphery length is used, this width may be formed by a single sheet material, or may be formed by splicing plural sheet materials in their width direction. For example, in case where the inner liner and the carcass each having a width of about 50 inches are required, a sheet material having a width of about 50 inches may be used singly, or five sheet materials each having a width of about 10 inches may be bonded in parallel. However, in case where the plural sheet materials are used, it is necessary to take a splice margin between the sheets into consideration.

The aforesaid bead supply means is one for supplying the completed bead having a bead core and a bead filler which correspond to specifications of the formed tire and, more concretely, it is preferable that the bead supply means is constituted such that it holds plural kinds of completed beads each having a bead core corresponding to the band periphery length, selects the completed bead corresponding to the specification of the formed tire from the plural kinds of completed beads, and supplies the selected completed bead to the band forming machine through the bead setter. However, it may be constituted such that the bead core corresponding to the band periphery length is prepared, and on its outer periphery there is formed the bead filler corresponding to the specification of the formed tire.

Further, as the injection unit it is preferable to use a plunger type injection unit in which there is accommodated, for the respective rubber parts, a rubber amount corresponding at least to the specification of the formed tire. Such a plunger type injection unit can precisely inject a required volume of unvulcanized rubber for the respective rubber parts and, moreover, can easily change the require volume for every tire.

Further, in order to achieve the aforesaid object, the invention provides a tire forming method using a tire forming system including a band forming machine, a shaping forming machine and a belt/tread forming machine, in each of which setting conditions of a tire size can be optionally changed, and having transport means for delivering a semi-fabricated product to each forming machine, wherein as a process for supplying a band member there are provided:

(1) an inner liner supply process for cutting a sheet-like inner liner material having a width, in which a splice margin is added to a band periphery length, to a length corresponding to a specification width of a formed tire, and supplying the cut inner liner to the band forming machine;

(2) a carcass supply process for cutting a sheet-like carcass material having a width, in which a splice margin is added to a band periphery length, to a length corresponding to a specification width of the formed tire, and supplying the cut carcass to the band forming machine;

(3) a band rubber parts supply process for injecting a rubber strip from an injection unit, winding the rubber strip around a drum of the band forming machine, and forming, on the basis of its laminated structure, a rubber parts having a profile corresponding to a specification of the formed tire; and (4) a bead supply process for supplying a completed bead corresponding to a specification of the formed tire to the band forming machine through a bead setter; and as a process for supplying a belt/tread member there are provided:

(5) a belt supply process for cutting a strip-like belt material, in which plural cords are arranged and rubberized, to predetermined length and angle, mutually splicing edge portions of the plural cut strip pieces to form a belt for one tire, which has a length, a cord angle and a width corresponding to specifications of the formed tire, and supplying the belt to the belt/tread forming machine; and (6) a tread rubber parts supply process for injecting a rubber strip from an injection unit, winding the rubber strip around a drum of the belt/tread forming machine, and forming, on the basis of its laminated structure, a rubber parts having a profile corresponding to a specification of the formed tire.

It is preferable that, in the above bead supply process, plural kinds of completed beads each having a bead core corresponding to the band periphery length are prepared, the completed bead corresponding to the specification of the formed tire is selected from the plural kinds of completed beads, and the selected completed bead is supplied to the band forming machine through the bead setter.

DETAILED DESCRIPTION OF THE PREFERRED EMBODIMENTS

Figure 1:
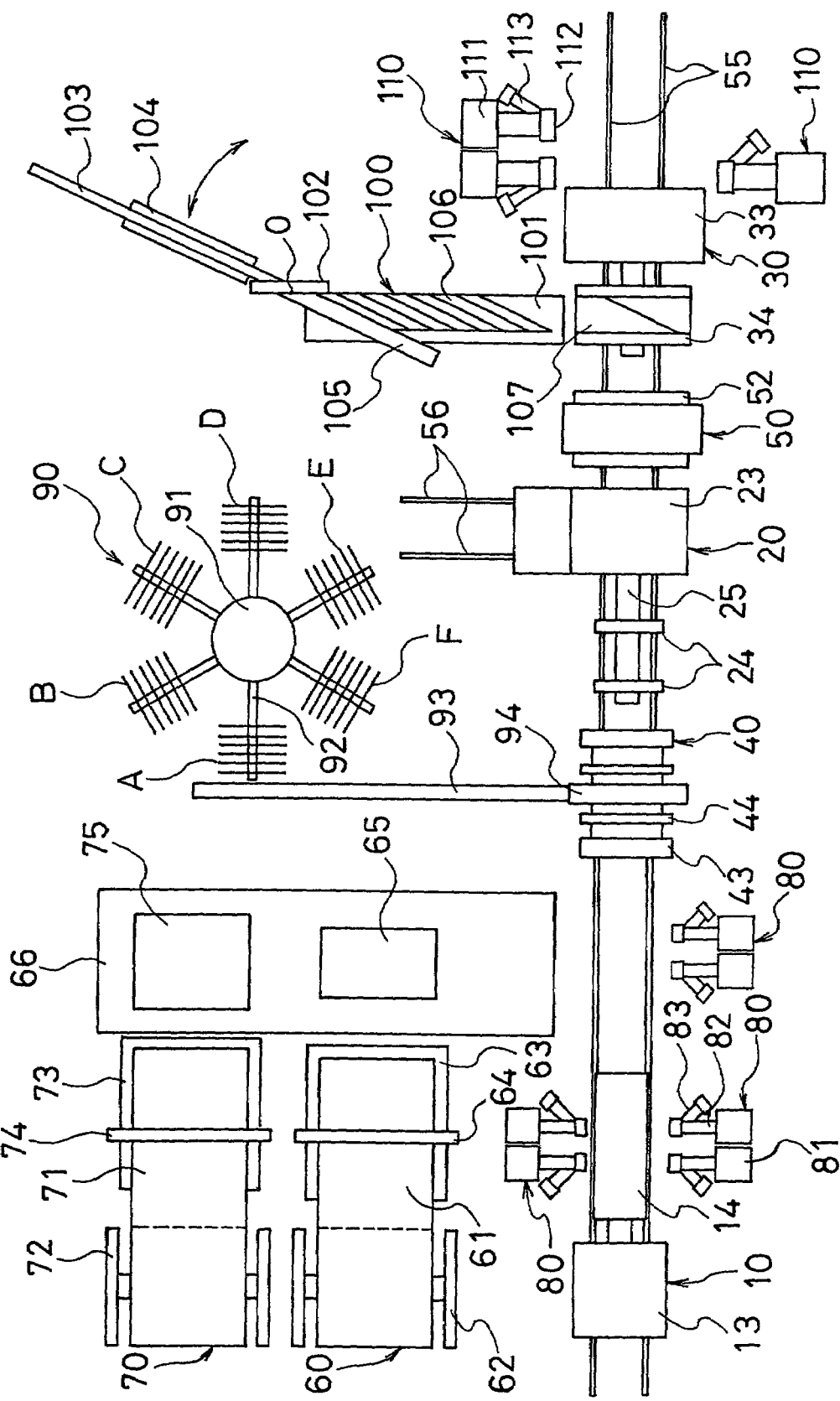
FIG. 1 is a plan view showing a tire forming system according to an embodiment of the invention.
Figure 2:
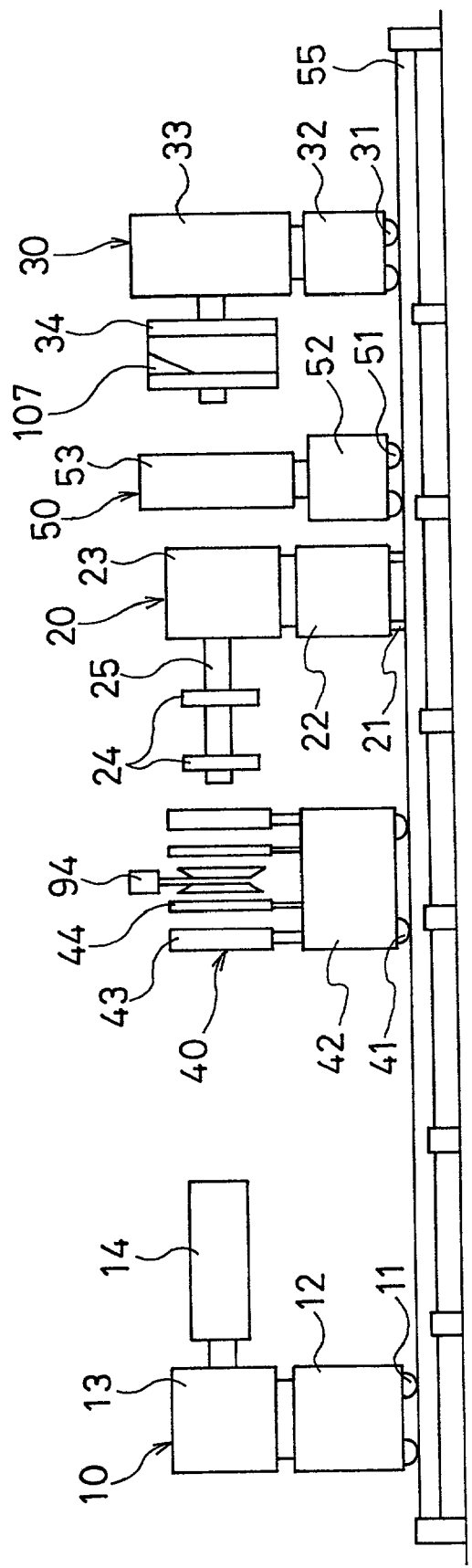
FIG. 2 is a side view showing, partially omitted, the tire forming system according to the embodiment of the invention.

FIG. 1 is a plan view showing a tire forming system according to an embodiment of the invention, and FIG. 2 a side view of the same. However, in FIG. 2, a part of constitution is omitted.

This system is a tire forming system including a band forming machine 10, a shaping forming machine 20 and a belt/tread forming machine 30, and having a band transfer 40 and a belt transfer 50 as transport means for delivering a semi-fabricated product to the respective forming machines 10, 20, 30. Each of the band forming machine 10, the shaping forming machine 20 and the belt/tread forming machine 30 is constituted such that setting conditions of a tire size can be optionally changed. Further, the band forming machine 10, the band transfer 40, the belt transfer 50 and the belt/tread forming machine 30 are arranged so as to be movable on one pair of left/right linearly laid rails 55. The shaping forming machine 20 is arranged so as to be movable on one pair of left/right rails 56 intersecting the rails 55.

The band forming machine 10 is provided on a carriage 12 having wheels 11 with a driving section 13, and supports a band drum 14 such that its rotary shaft horizontally extends from the driving section 13. The band drum 14 is constituted so as to be retractable in a drum radius direction by a drive of the driving section 13. The carriage 12 is controlled in its position on the rails 55 by a control unit (not shown).

The shaping forming machine 20 is provided on a carriage 22 having wheels 21 with a driving section 23, and supports the driving section 23 such that it extends from a rails 56 side to a region just above the rails 55 and a retractable driving shaft 25 having one pair of shaping drums 24 horizontally extends from the driving section 23. One pair of shaping drums 24 are adapted such that a mutual spacing is variable by a retraction of the driving shaft 25. Further, a bead clamp section of the shaping drum 24 is constituted so as to be retractable. The carriage 22 is controlled in its position on the rails 56 by a control unit (not shown).

The belt/tread forming machine 30 is provided on a carriage 32 having wheels 31 with a driving section 33, and supports a forming drum 34 such that its rotary shaft horizontally extends from the driving section 33. The forming drum 34 is constituted so as to be retractable in a drum radius direction by a drive of the driving section 33. The carriage 32 is controlled in its position on the rails 55 by a control unit (not shown).

The band transfer 40 has a constitution in which one pair of left/right holding rings 43 for holding a band member in its cylindrical form intact and one pair of left/right bead setters 44 for holding completed beads to predetermined positions in an outer periphery side of the band member are provided on a carriage 42 having wheels 41. The carriage 42 is controlled in its position on the rails 55 by a control unit (not shown).

The belt transfer 50 has a constitution in which a grip section 53 for gripping a belt/tread member from outside is provided on a carriage 52 having wheels 51. The carriage 52 is controlled in its position on the rails 55 by a control unit (not shown).

In the tire forming system mentioned above, as means for supplying the band member, there are arranged an inner liner servicer 60, a carcass servicer 70, rubber parts servicers 80 and a bead servicer 90.

The inner liner servicer 60 is adapted such that a long sheet-like inner liner material 61 having a width in which a splice margin is added to a specified band periphery length is held by a reel 62, the inner liner material 61 unwound from the reel 62 is sent with a predetermined length unit by a conveyor 63 and cut by a cutter 64 to a length corresponding to a specification width of a formed tire, and thus an inner liner 65 having a necessary dimension is formed.

The carcass servicer 70 is adapted such that a long sheet-like carcass material 71 having a width in which a splice margin is added to a specified band periphery length is held by a reel 72, the carcass material 71 unwound from the reel 72 is sent with a predetermined length unit by a conveyor 73 and cut by a cutter 74 to a length corresponding to a specification width of the formed tire, and thus a carcass 75 having a necessary dimension is formed.

That is, the inner liner servicer 60 and the carcass servicer 70 are adapted such that they can respectively supply the inner liner 65 and the carcass 75 which are used in a tire having the same bead inner diameter corresponding to the specified band periphery length, and the cut dimensions of the inner liner and the carcass can be changed in compliance with an oblate ratio and a tread width of the formed tire. The inner liner 65 and the carcass 75 are adapted so as to be sequentially supplied to the band forming machine 10 through a carrying conveyor 66. The inner liner material 61 can be composed of a rubber and the like. Further, as the carcass material 71, it is possible to use a calender material rubberized by pulling together plural cords along a sheet longitudinal direction.

The plural rubber parts servicers 80 are arranged in the vicinity of the band forming machine 10 such that compounds constituting the band member, such as a rim cushion, side walls and a belt edge cushion, correspond to different parts. Each of the rubber parts servicers 80 has an injection unit 82 extending from a hydraulic cylinder 81 toward the band forming machine 10, and a feed extruder 83 is provided in a tip portion of the injection unit 82. The rubber parts servicer 80 is constituted so as to be shiftable by a driving unit (not shown) to an optional position in axial and radial directions of the band drum 14. And, the rubber parts servicer 80 is adapted such that a rubber strip injected from the injection unit 82 is wound around the band drum 14 to thereby form, on the basis of its laminated structure, the rubber parts for band having a profile corresponding to a specification of the formed tire.

More concretely, the above strip winding technique is adapted such that a desired profile is realized by bonding a tip of the rubber strip to the band drum 14, rotating the band drum 14 while continuously injecting the rubber strip from the injection unit 82, traversing the rubber parts servicers 80 along an axial direction of the band drum 14, and controlling a rotating speed of the band drum 14 and traversing speeds of the rubber parts servicers 80.

The bead servicer 90 is one for supplying a completed bead corresponding to a specification of the completed tire to the band forming machine 10 through the bead setter 44. More concretely, the bead servicer 90 is adapted such that plural kinds of completed beads A to F are respectively held, while being classified by the kind, on plural holding arms 92 radially extending from a bead stocker 91. Each of the completed beads A to F is one in which a bead core corresponding to the band periphery length and bead fillers of variously different shapes or compounds are combined. The bead stocker 91 is rotatable, and adapted such that one pair of completed beads corresponding to the specification of the formed tire are selected from the plural kinds of completed beads A to F, and the selected one pair of completed beads are delivered to a bead transfer 93. The bead transfer 93 is extended to a region just above the band transfer 40, and adapted such that the selected one pair of completed beads are supplied to the bead setter 44 through a delivering arm 94.

In the above tire forming system, as means for supplying the belt/tread member, there are arranged a belt servicer 100, and rubber parts servicers 110.

The belt servicer 100 is adapted such that a cutter 102 extending in a conveyor carrying direction is arranged in an edge portion of a carrying conveyor 101, and a strip-like belt material 103 is supplied onto the carrying conveyor 101 while being passed below the cutter 102. The belt material 103 is transported by a conveyor 104, and carried to a predetermined position on the carrying conveyor 101 while being guided by a splicer 105 having a guide function. A supplying angle of the belt material 103 with respect to a carrying direction of the carrying conveyor 101 is adapted so as to be changeable about a center axis O together with the conveyor 104 and the splicer 105. Therefore, a cutting angle of the belt material 103 can be optionally selected on the basis of the supplying angle of the belt material 103. On the other hand, a cut length of the belt material 103 can be optionally selected on the basis of a feeding amount of the conveyor 104. Further, the belt material 103 is one rubberized by pulling together plural cords. Such a belt material 103 may be directly supplied from a calender unit or an insulation extruder, or may be supplied from a reel around which one formed by the calender unit or the insulation extruder has been once wound.

If the carrying conveyor 101 transports a strip piece 106 cut from the belt material 103 by a distance corresponding approximately to a strip width to a belt/tread forming machine 30 side, the further belt material 103 is supplied onto the carrying conveyor 101. And, the splicer 105 mutually splices, in order, edge portions of the strip pieces 106, 106 adjoining each other. By means of splicing integer number of strip pieces 106 by repeating such a process, it is possible to form a belt 107 for one tire having a length, a cord angle and a width, which correspond to specifications of the formed tire. On this occasion, in order to make the number of the strip pieces 106 an integer, it is preferable to cause the length of the belt 107 to agree with a specification belt length by adjusting a minute angle (within ±1°) with respect to a specification cord length of the formed tire. The belt 107 is supplied as it is to the belt/tread forming machine 30 through the carrying conveyor 101.

The plural rubber parts servicers 110 are arranged in the vicinity of the belt/tread forming machine 30 such that compounds constituting the belt/tread member, such as an under tread and a cap tread, correspond to different parts. Each of the rubber parts servicers 110 has an injection unit 112 extending-from a hydraulic cylinder 111 toward the belt/tread forming machine 30, and a feed extruder 113 is provided in a tip portion of the injection unit 112. The rubber parts servicer 110 is constituted so as to be shiftable by a driving unit (not shown) to an optional position in axial and radial directions of the forming drum 34. And, the rubber parts servicer 110 is adapted such that a rubber strip injected from the injection unit 112 is wound around the forming drum 34 to thereby form, on the basis of its laminated structure, the rubber parts for tread consisting of a profile corresponding to a specification of the formed tire.

More concretely, the above strip winding technique is adapted such that a desired profile is realized by bonding a tip of the rubber strip to the forming drum 34, rotating the forming drum 34 while continuously injecting the rubber strip from the injection unit 112, traversing the rubber parts servicers 110 along an axial direction of the forming drum 34, and controlling a rotating speed of the forming drum 34 and traversing speeds of the rubber parts servicers 110.

Figure 3:
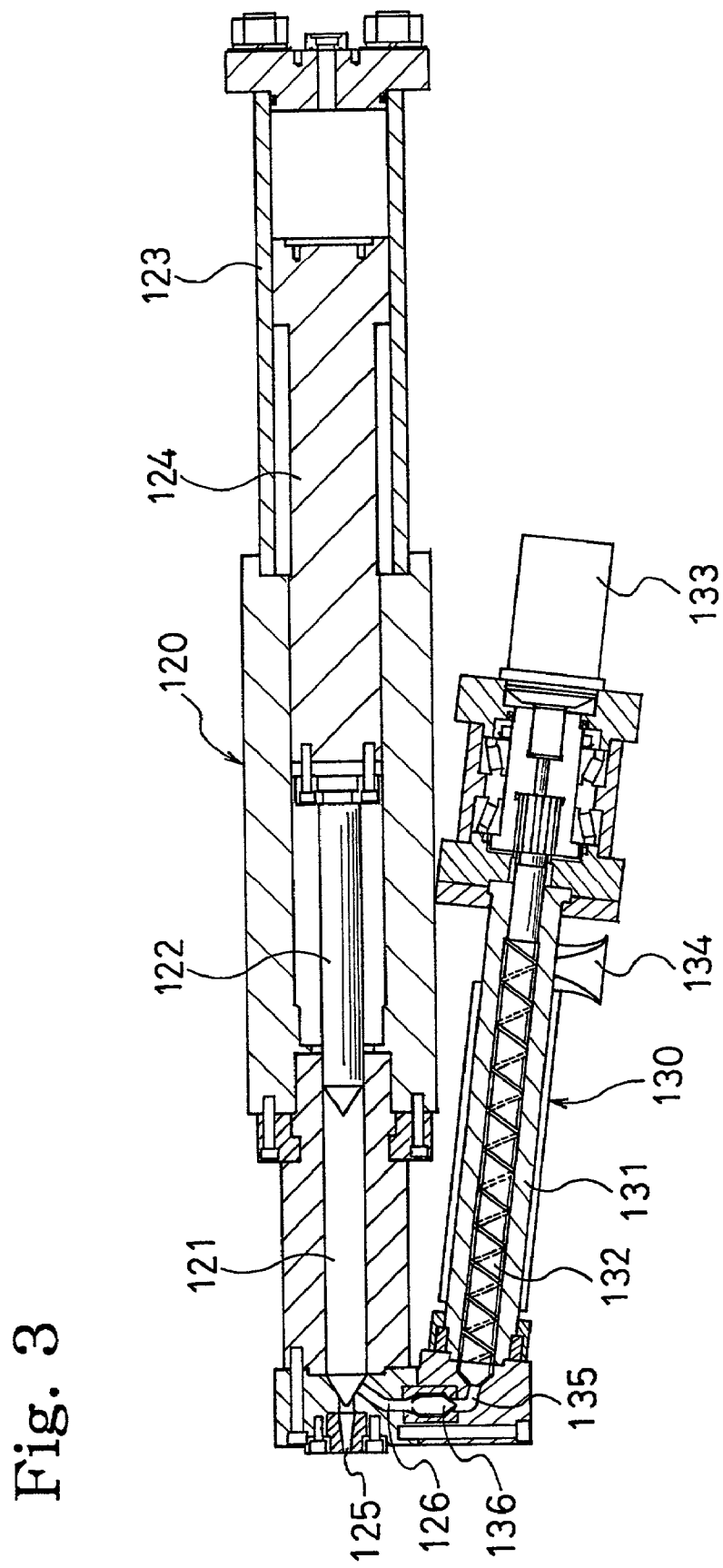
FIG. 3 is a sectional view exemplifying a rubber servicer used in the invention.

As the aforesaid injection unit of the rubber parts servicers 80, 110, it is preferable to use a plunger type injection unit accommodating a rubber amount corresponding, for the respective rubber parts, at least to a specification of the formed tire. FIG. 3 exemplifies the rubber parts servicer using the plunger type injection unit. As shown in FIG. 3, a plunger type injection unit 120 has a constitution in which a plunger 122 is slidably provided inside a cylindrical injection pot 121 and the plunger 122 is moved back and forth by a piston cylinder 124 extending from a hydraulic cylinder 123, and is adapted such that an unvulcanized rubber accommodated in the injection pot 121 is injected from a die 125. The plunger type injection unit 120 has advantages that it can precisely inject the unvulcanized rubber in a volume necessary for the respective rubber parts and, moreover, can easily change a volume of the compounds necessary for every one tire.

Further, as means for pouring the unvulcanized rubber into the plunger type injection unit 120, it is preferable to use a screw type feed extruder 130. The screw type feed extruder 130 has a constitution in which a screw 132 is rotatably provided inside a cylindrical cylinder 131 and the screw 132 is driven to rotate by a hydraulic motor 133, and is adapted such that the unvulcanized rubber supplied from a rubber supply section 134 is moved by a rotation of the screw 132 to feed it from a discharge port 135 into the injection pot 121 of the injection unit 120. The discharge port 135 of the feed extruder 130 is connected to an input port 126 provided in the injection pot 121. Further, a check valve 136 for regulating a flow of the unvulcanized rubber in one direction is provided in the discharge port 135. When feeding to the injection unit 120, the plunger 122 of the injection unit 120 is retracted by pouring the unvulcanized rubber from the feed extruder 130 into the injection pot 121 of the injection unit 120.

Further, it is preferable that dimensions of a rubber strip injected from the injection unit 120 are made 0.5 to 3.0 mm in thickness and 5 to 30 mm in width. If these dimensions are too small it becomes difficult to efficiently form the tire and, reversely, if they are too large an accuracy of a profile of the rubber parts is deteriorated.

Next, it is detailedly explained about a tire forming method using the tire forming system mentioned above.

Figure 4A:
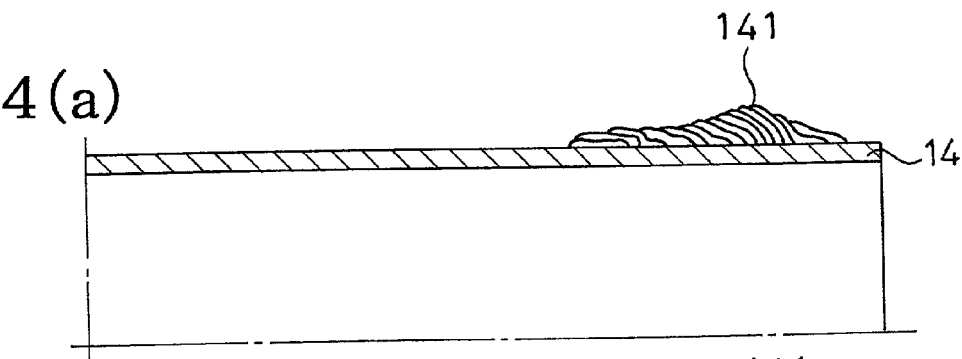
FIG. 4(a) to FIG. 4(d) are sectional views of main portion, showing forming processes of a band member by the tire forming system of the invention.
Figure 4B:
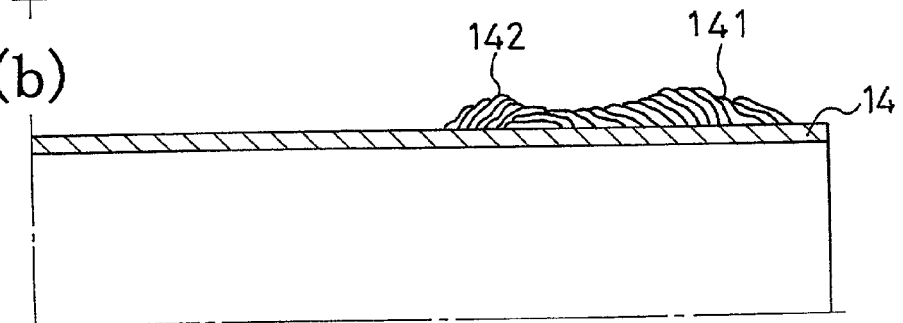
Figure 4C:
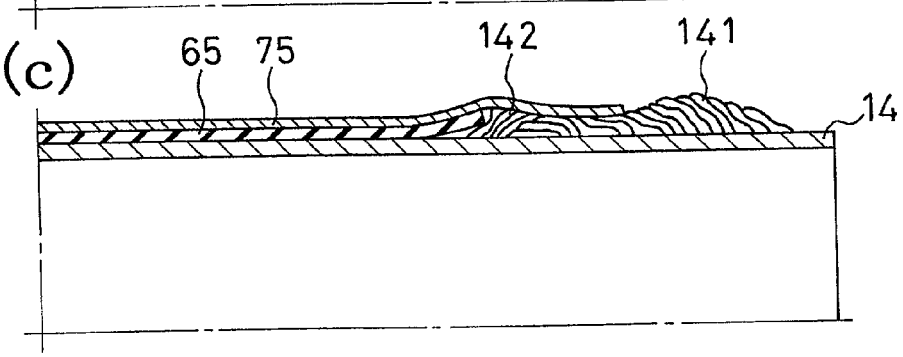

FIG. 4(a) to FIG. 4(d) show forming processes of the band member. In the forming processes of a band member 140, the band drum 14 is first disposed to a position facing the rubber parts servicers 80 by moving the band forming machine 10 on the rails 55. And, the desired compounds are accommodated, for the respective rubber parts, in the injection units 82 of the rubber parts servicers 80, corresponding to the rim cushion and the side wall, and the rubber strips supplied from the injection units 82 are wound around the band drum 14 while controlling the rotating speed of the band drum 14 and the traversing speeds of the rubber parts servicers 80. In this manner, a side wall 141 shown in FIG. 4(a) is formed at a position, in the band drum 14, corresponding to the specification of the formed tire and, additionally, a rim cushion 142 shown in FIG. 4(b) is formed.

Next, the desired compounds are accommodated, for the respective rubber parts, in the injection unit 82 of the rubber parts servicers 80, corresponding to the belt edge cushion, and the rubber strip supplied from the injection unit 82 is wound around a predetermined position of the carcass 75 on the band drum 14 while controlling the rotating speed of the band drum 14 and the traversing speed of the rubber parts servicer 80. In this manner, a belt edge cushion 143 shown in FIG. 4(d) is formed at a position corresponding to the specification of the formed tire.

Next, the desired compounds are accommodated, for every parts, in the injection unit 82 of the rubber parts servicers 80, corresponding to the belt edge cushion, and the rubber strip supplied from the injection unit 82 is wound around a predetermined position of the carcass 75 on the band drum 14 while controlling the rotating speed of the band drum 14 and the traversing speed of the rubber parts servicer 80. In this manner, a belt edge cushion 143 shown in FIG. 4(d) is formed at a position corresponding to the specification of the formed tire.

On the other hand, the bead servicer 90 selects one kind of completed bead corresponding to the specification of the formed tire from the plural kinds of completed beads A to F, and they are set to the bead setter 44 of the band transfer 40.

Figure 4D:
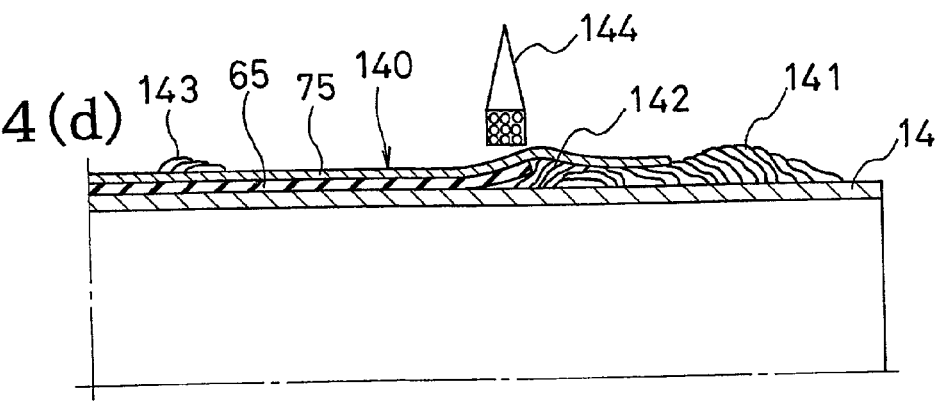
Figure 5A:
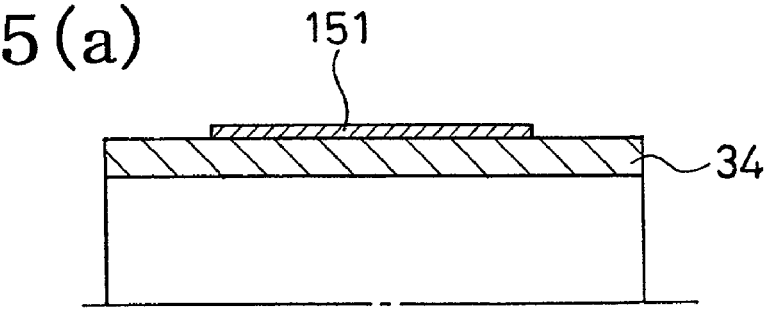
FIG. 5(a) to FIG. 5(d) are sectional views of main portion, showing forming processes of a belt/tread member by the tire forming system of the invention.
Figure 5B:
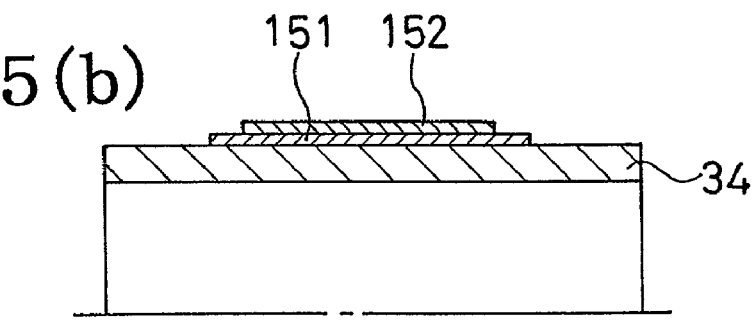
Figure 5C:
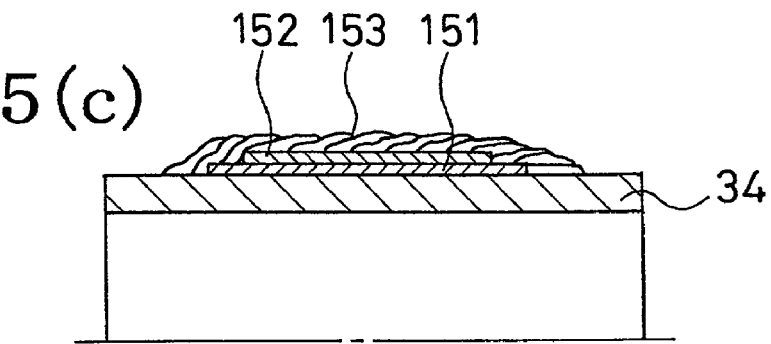
Figure 5D:
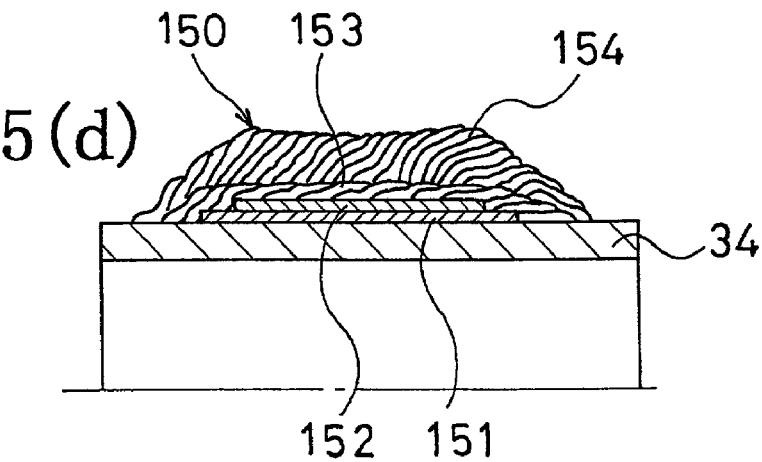

Next, as shown in FIG. 4(d), one pair of left/right completed beads 144 are disposed on an outer periphery side of the band drum 14 by moving the band transfer 40 on the rails 55. And, one pair of left/right completed beads 144 are fixed to the band member 140 wound around the band drum 14 by slightly expanding the band drum 14 in its diameter. And, the band transfer 40 is moved on the rails 55 while holding the band member 140 in its cylindrical form by the holding rings 43 of the band transfer 40, and the band member 140 is carried to the shaping forming machine 20.

FIG. 5(a) to FIG. 5(d) show forming processes of the belt/tread member. In the forming processes of a belt/tread member 150, the forming drum 34 is first disposed to a position facing the carrying conveyor 101 of the belt servicer 100 by moving the belt/tread forming machine 30 on the rails 55. And, a 1st belt 151 and a 2nd belt 152, for one tire, which have lengths, cord angles and widths corresponding to the specifications of the formed tire are supplied from the belt servicer 100. In this manner, the 1st belt 151 is wound around the forming drum 34 as shown in FIG. 5(*a*) and, additionally, the 2nd belt 152 is wound as shown in FIG. 5(*b*). As occasion demands, rubber tapes may be wound on both end portions of the 1st belt 151, or a jointless belt reinforcing layer may be wound on the 2nd belt 152.

Next, the forming drum 34 is disposed to a position facing the rubber parts servicers 110 by moving the belt/tread forming machine 30 on the rails 55. And, desired compounds are accommodated in the injection unit 112 of the rubber parts servicer 110 for the under tread, and the rubber strip supplied from the injection unit 112 is wound around the forming drum 34 while controlling the rotating speed of the forming drum 34 and the traversing speed of the rubber parts servicer 110. In this manner, an under tread 153 shown in FIG. 5(*c*) is formed around the forming drum 34. Then, desired compounds are accommodated in the injection unit 112 of the rubber parts servicer 110 for the cap tread, and a cap tread 154 shown in FIG. 5(*d*) is formed by the rubber strip winding on the basis of a control similar to the above.

Next, the belt transfer 50 is moved on the rails 55 and the grip section 53 is disposed to an outer periphery side of the forming drum 34. Then, after gripping the belt/tread member 150 by the grip section 53, by slightly contracting the forming drum 34 in its diameter, the belt/tread 150 is held by the grip section 53. And, the belt/tread member 150 is carried to the shaping forming machine 20 by moving the belt transfer 50 on the rails 55. Incidentally, when carrying the belt/tread member 150 to the shaping forming machine 20, the shaping forming machine 20 is preliminarily moved on the rails 56 so as to deviate from an orbit of the belt transfer 50.

Figure 6A:
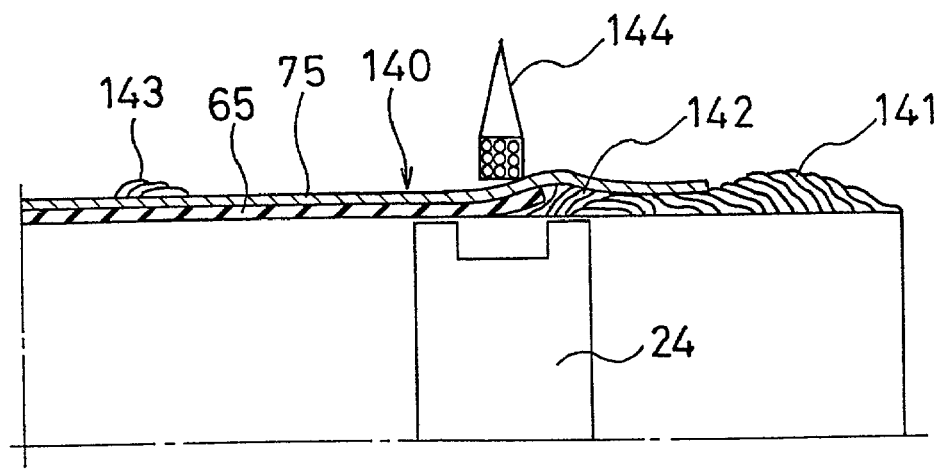
FIG. 6(a) to FIG. 6(b) are sectional views of main portion, showing shaping processes by the tire forming system of the invention.
Figure 6B:
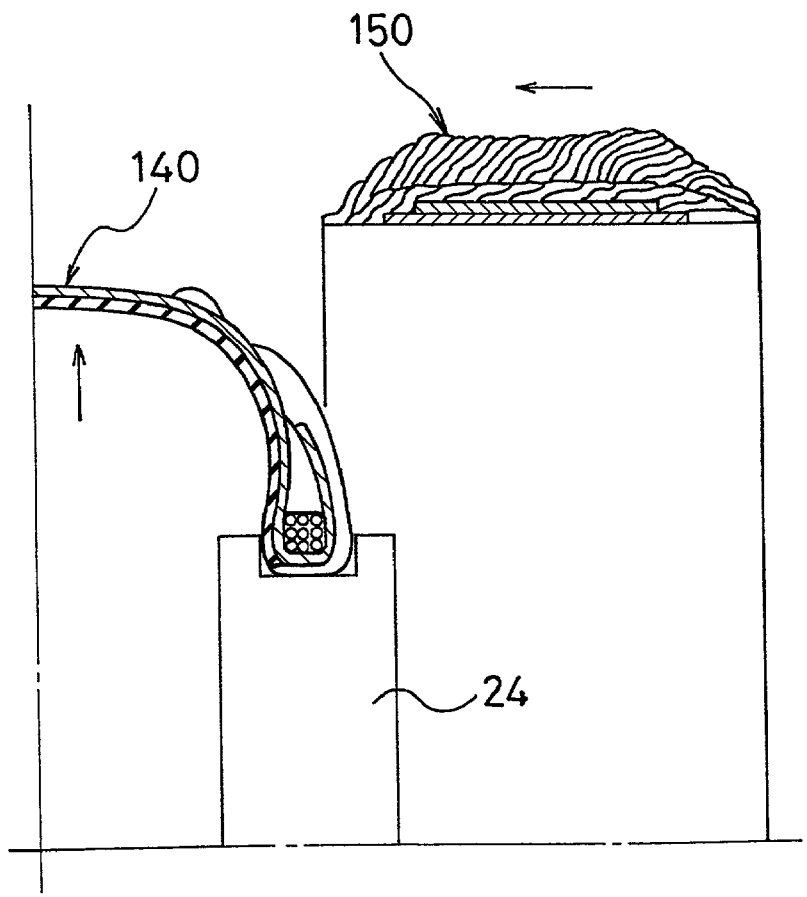

FIG. 6(*a*) to FIG. 6(*b*) show shaping processes. In the shaping processes, as shown in FIG. 6(*a*), the band member 140 is mounted by expanding one pair of left/right shaping drums 24 of the shaping forming machine 20 in their diameters. And, as shown in FIG. 6(*b*), a carcass end portion of the band member 140 is rolled up around the bead while exerting a pressure from an inside of the band member 140, and the band member 140 is expanded in its diameter by narrowing a mutual spacing of the shaping drums 24, thereby integrating the band member 140 and the belt/tread member 150. Further, in order to strengthen a bonded state between the integrated band member 140 and the belt/tread member 150, a bonded portion may be worked by a stretcher and the like.

In the above tire forming system, so long as the tire has the same bead inner diameter, the stage switchover can be performed instantaneously. For example, as to the inner liner 65 and the carcass 75, the stage switchover is completed merely by changing the cutting lengths of the inner liner servicer 60 and the carcass servicer 70. As to the rubber parts for band, such as the side wall 141, the rim cushion 142 and the belt edge cushion 143, the stage switchover is completed merely by changing the setting of the rubber parts servicer 80. As to the completed bead 144, the stage switchover is completed merely by changing the selection of the bead servicer 90. As to the belt such as the 1st belt 151 and the 2nd belt 152, the stage switchover is completed merely by changing the setting of the belt servicer 100. As to the rubber parts for tread, such as the under tread 153 and the cap tread 154, the stage switchover is completed merely by changing the setting of the rubber parts servicer 110. And, since each of the above stage switchovers can be performed by means of an automatic control by a computer and the like, the stage switchovers of the whole system can be automatically performed instantaneously. As a result, the tire whose bead inner diameter is the same but which is different in its tire size, use and characteristics can be continuously formed in one unit.

In this manner, if it becomes possible to form the tires different in specification in one unit, such a fact becomes null that the unvulcanized tires waiting for being vulcanized in a specified metal mold are accumulated. For example, if six kinds of tires corresponding to the completed beads A to F are formed in order, since it is possible to supply in order the unvulcanized tires to six kinds of metal molds, it is possible to reduce the lead time by causing the forming cycle time to agree with the vulcanizing cycle time, thereby reducing the goods in process of the unvulcanized tires.

Further, in the above tire forming system, since the parts preparation process is connected respectively to the band forming machine 10 and the belt/tread forming machine 30, it is possible to nullify the goods in process of the intermediate members other than the completed beads A to F.

Accordingly, if the forming of the pneumatic tire is performed by the above tire forming system, it becomes possible to reduce costs of the goods in process, a management and auxiliary members, so that it becomes possible to greatly increase a production efficiency of the tire and manufacture the tire stable also in its quality.

Figure 7:
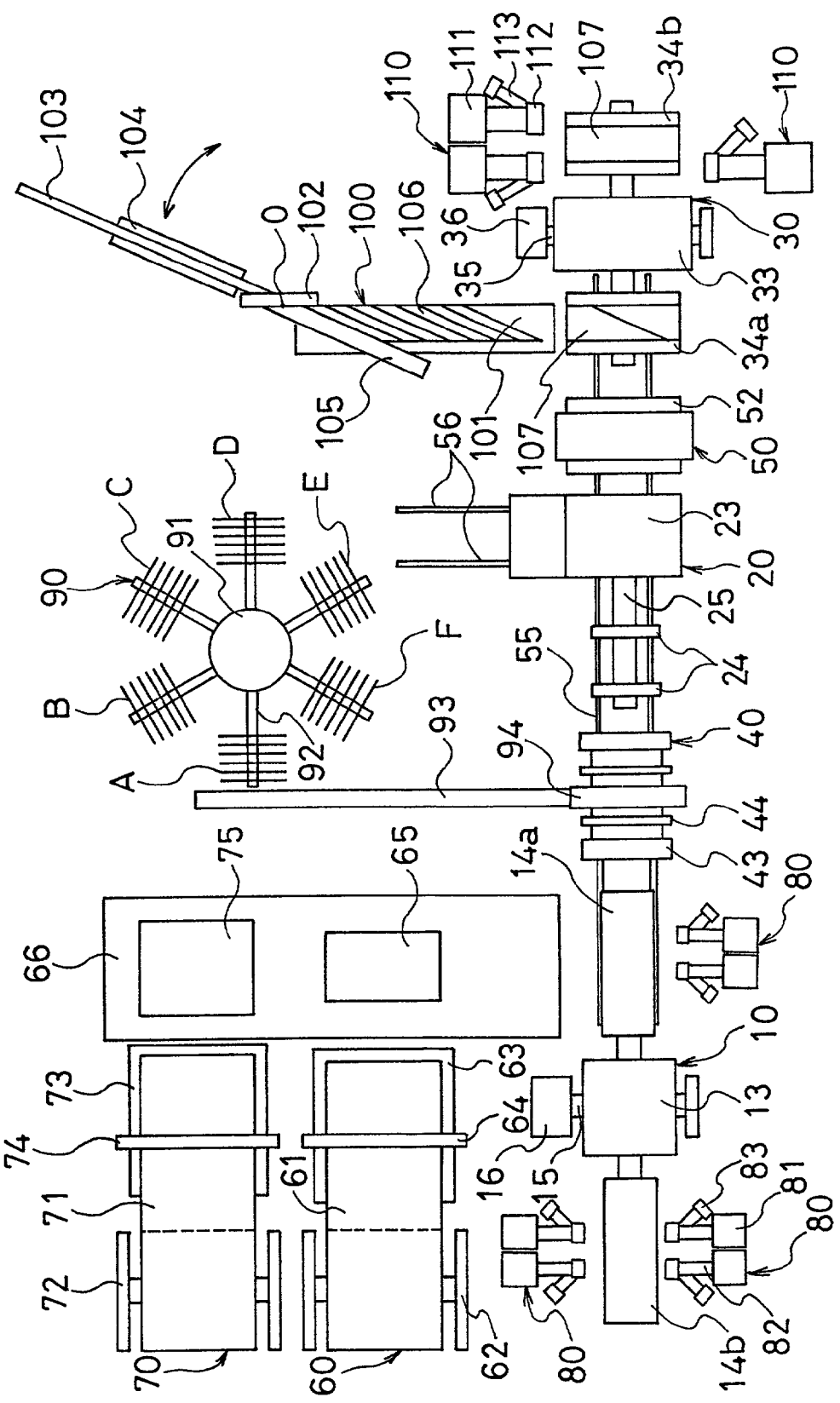
FIG. 7 is a plan view showing a tire forming system according to another embodiment of the invention.
Figure 8:
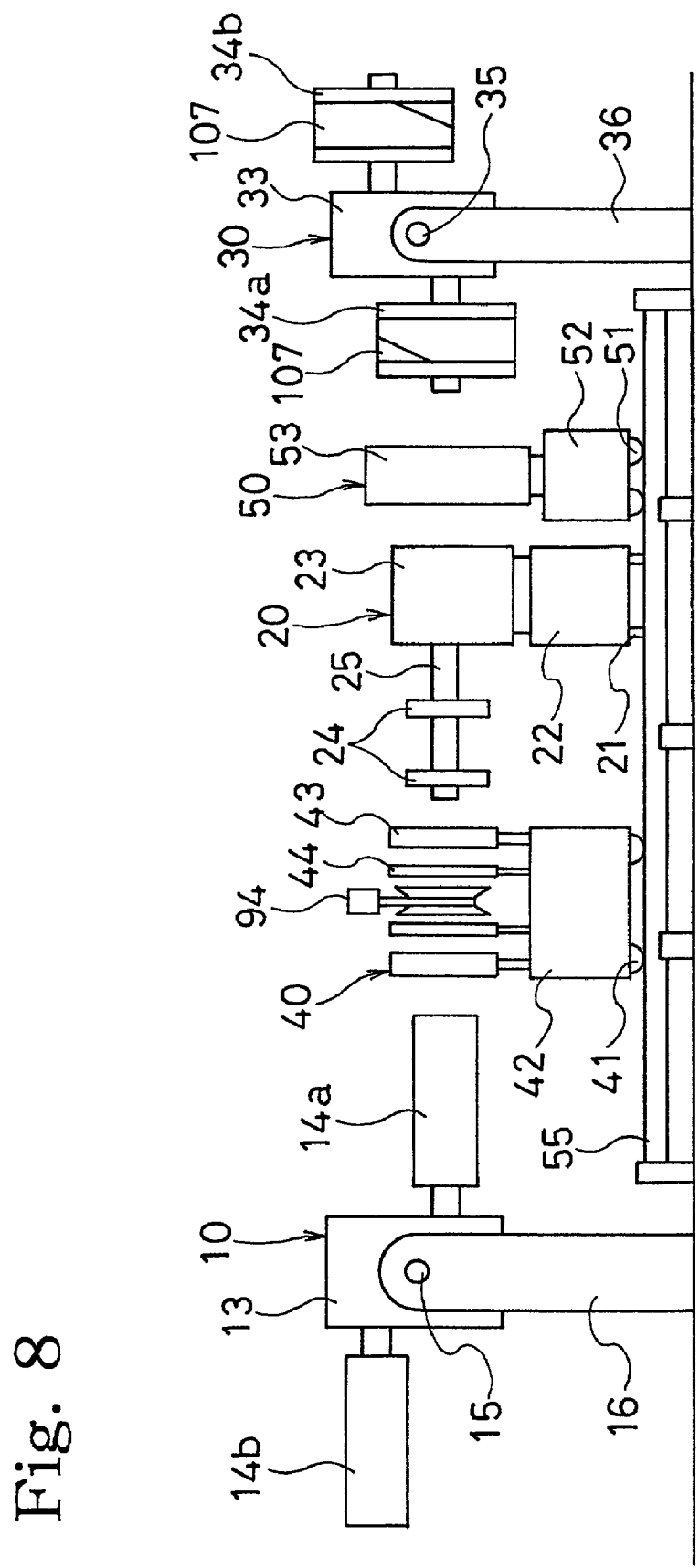
FIG. 8 is a side view showing, partially omitted, the tire forming system according to another embodiment of the invention.

FIG. 7 is a plan view showing a tire forming system according to another embodiment of the invention, and FIG. 8 is a side view of the same. However, in FIG. 8, a part of the constitution is omitted. This embodiment is one in which only the band forming machine 10 and the belt/tread forming machine 30 are differentiated from the aforesaid embodiment, so that the same reference numeral is given to the same component as FIG. 1 and FIG. 2, and the detailed explanation of that component is omitted.

The band forming machine 10 has two band drums 14*a*, 14*b* in front and rear of the driving section 13. The driving section 13 is connected to a reversing unit 16 through a horizontally extending support shaft 15. The reversing unit 16 is adapted so as to rotate the driving section 13 around the support shaft 15, thereby replacing positions of the two band drums 14*a*, 14*b*. Further, the carrying conveyor 66 and the rubber parts servicers 80 are arranged in positions respectively facing the two band drums 14*a*, 14*b*.

In this manner, by providing the band forming machine 10 with the two band drums 14*a*, 14*b* to constitute such that both are interchangeable, it becomes possible to perform a forming operation of the rubber parts for band by one band drum 14*b* while performing a winding operation of the inner liner and the carcass by the other band drum 14*a*, so that it is possible to further increase the production efficiency of the tire.

On the other hand, the belt tread forming machine 30 has two forming drums 34*a*, 34*b* in front and rear of the driving section 33. The driving section 33 is connected to a reversing unit 36 through a horizontally extending support shaft 35. The reversing unit 36 is adapted so as to rotate the driving section 33 around the support shaft 35, thereby replacing positions of the two forming drums 34*a*, 34*b*. Further, the carrying conveyor 101 and the rubber parts servicers 110 are arranged in positions respectively facing the two forming drums 34*a*, 34*b*.

In this manner, by providing the belt/tread forming machine 30 with the two band drums 34*a*, 34*b* to constitute such that both are interchangeable, it becomes possible to perform a forming operation of the rubber parts for tread by one forming drum 34*b* while performing a winding operation of the belt by the other forming drum 34a, so that it is possible to further increase the production efficiency of the tire.

In the invention, as to the band forming machine, the shaping forming machine and the belt/tread forming machine, although it is required that setting conditions of the tire size can be optionally changed, a concrete constitution therefor is not limited specifically, and it is possible to adopt an optional expansion/contraction mechanism or retractable mechanism, and the like.

As explained above, according to the invention, in the tire forming system capable of optionally changing the setting conditions of the tire size, since it is constituted such that, in regard to the formed tire having the specified band periphery length, the supply means of all parts can be optionally set in compliance with the specification of the formed tire, it is possible to perform the stage switchover instantaneously so long as the tire has the same bead inner diameter, so that it is possible to continuously form the tires different in specification in one unit. Further, since the parts preparation process is connected to each forming machine, it is possible to reduce the goods in process of the intermediate members.

Accordingly, if the tire forming system of the invention is adopted, in comparison with the prior art, it becomes possible to reduce costs of the goods in process, a management and auxiliary members, so that it becomes possible to greatly increase the production efficiency of the tire and manufacture the tire stable also in its quality.

What is claimed is:

1. A tire forming system including a band forming machine, a shaping forming machine and a belt/tread forming machine, in each of which setting conditions of a tire size can be optionally changed, and having transport means for delivering a semi-fabricated product to each forming machine, wherein as means for supplying a band member there are provided:
   (1) inner liner supply means for cutting a inner liner sheet material having a width, in which a splice margin is added to a band periphery length, to a length corresponding to a specification width of a formed tire, and supplying the cut inner liner to the band forming machine;
   (2) carcass supply means for cutting a carcass sheet material having a width, in which a splice margin is added to a band periphery length, to a length corresponding to a specification width of the formed tire, and supplying the cut carcass to the band forming machine;
   (3) band rubber parts supply means for injecting a rubber strip from an injection unit, winding the rubber strip around a drum of the band forming machine, and forming, on the basis of its laminated structure, rubber parts having a profile corresponding to a specification of the formed tire; and
   (4) bead supply means for supplying a completed bead corresponding to a specification of the formed tire to the band forming machine through a bead setter; and
   as means for supplying a belt/tread member there are provided:
   (5) belt supply means for cutting a belt strip material, in which plural cords are arranged and rubberized, to predetermined length and angle, mutually splicing edge portions of the plural cut strip pieces to form a belt for one tire, which has a length, a cord angle and a width corresponding to specifications of the formed tire, and supplying the belt to the belt/tread forming machine; and
   (6) tread rubber parts supply means for injecting a rubber strip from an injection unit, winding the rubber strip around a drum of the belt/tread forming machine, and forming, on the basis of its laminated structure, rubber parts having a profile corresponding to a specification of the formed tire,
   wherein the means for supplying the band member and the means for supplying the belt/tread member are operative to cooperate with one another to continuously in series form a plurality of tires having different tire sizes yet a same bead inner diameter and
   wherein the bead supply means holds plural kinds of completed beads each having a bead core corresponding to the band periphery length, selects the completed bead corresponding to the specification of the formed tire from the plural kinds of completed beads, and supplies the selected completed bead to the band forming machine through the bead setter, and
   wherein the drum of the band forming machine is movable between a position facing the band rubber parts supply means for winding of the rubber strip and a position for winding of the supplied cut inner liner and cut carcass.

2. A tire forming system set forth in claim 1, wherein each of the injection unit for the band rubber parts supply means and the injection unit for the tread rubber parts supply means is a plunger type injection unit in which there is accommodated, for the respective rubber parts, a rubber amount corresponding at least to the specification of the formed tire.

3. A tire forming method using a tire forming system including a band forming machine, a shaping forming machine and a belt/tread forming machine, in each of which setting conditions of a tire size can be optionally changed, and having transport means for delivering a semi-fabricated product to each forming machine, wherein as a process for supplying a band member there are provided:
   (1) an inner liner supply process for cutting a inner liner sheet material having a width, in which a splice margin is added to a band periphery length, to a length corresponding to a specification width of a formed tire, and supplying the cut inner liner to the band forming machine;
   (2) a carcass supply process for cutting a carcass sheet material having a width, in which a splice margin is added to a band periphery length, to a length corresponding to a specification width of the formed tire, and supplying the cut carcass to the band forming machine;
   (3) a band rubber parts supply process for injecting a rubber strip from an injection unit, winding the rubber strip around a drum of the band forming machine, and forming, on the basis of its laminated structure, rubber parts having a profile corresponding to a specification of the formed tire; and
   (4) a bead supply process for supplying a completed bead corresponding to a specification of the formed tire to the band forming machine through a bead setter; and
   as a process for supplying a belt/tread member there are provided:
   (5) a belt supply process for cutting a belt strip material, in which plural cords are arranged and rubberized, to predetermined length and angle, mutually splicing edge portions of the plural cut strip pieces to form a belt for one tire, which has a length, a cord angle and a width corresponding to specifications of the formed tire, and supplying the belt to the belt/tread forming machine; and (6) a tread rubber parts supply process for injecting a rubber strip from an injection unit, winding the rubber strip around a drum of the belt/tread forming machine, and forming, on the basis of its laminated structure, rubber parts having a profile corresponding to a specification of the formed tire, wherein the forming system is operative to continuously in series form a plurality of tires having different tire sizes yet a same bead inner diameter and wherein, in the bead supply process, plural kinds of completed beads each having a bead core corresponding to the band periphery length are prepared and held, the completed bead corresponding to the specification of the formed tire is selected from the plural kinds of completed beads being held, and the selected completed bead is supplied to the band forming machine through the bead setter, and wherein the drum of the band forming machine is movable between a position for receiving the wound strip in the band rubber parts supply process and a position for winding of the supplied cut inner liner and cut carcass.

4. A tire forming method set forth in claim 3, wherein each of the injection unit for the band rubber parts supply process and the injection unit for the tread rubber parts supply process is a plunger type injection unit in which there is accommodated, for the respective rubber parts, a rubber amount corresponding at least to the specification of the formed tire.

* * * * *